(12) United States Patent
Yoon et al.

(10) Patent No.: US 11,993,702 B2
(45) Date of Patent: May 28, 2024

(54) THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

(71) Applicants: HYUNDAI MOTOR COMPANY, Seoul (KR); KIA CORPORATION, Seoul (KR); LOTTE CHEMICAL CORPORATION, Seoul (KR)

(72) Inventors: Jin Young Yoon, Gimpo-si (KR); Hee Joon Lee, Seoul (KR); Dong Eun Cha, Hwaseong-si (KR); Sun Jun Kwon, Seoul (KR); Chun Ho Park, Seoul (KR); Seung Ryong Jeong, Seoul (KR); Kyung Hwan Lim, Uiwang-si (KR); Eun Hwa Jang, Uiwang-si (KR)

(73) Assignees: HYUNDAI MOTOR COMPANY, Seoul (KR); KIA CORPORATION, Seoul (KR); LOTTE CHEMICAL CORPORATION, Seoul (KR)

( * ) Notice: Subject to any disclaimer, the term of this patent is extended or adjusted under 35 U.S.C. 154(b) by 7 days.

(21) Appl. No.: 17/858,378

(22) Filed: Jul. 6, 2022

(65) Prior Publication Data
US 2023/0017798 A1 Jan. 19, 2023

(30) Foreign Application Priority Data
Jul. 6, 2021 (KR) ........................ 10-2021-0088632

(51) Int. Cl.
*C08L 23/16* (2006.01)
*C08L 23/10* (2006.01)

(52) U.S. Cl.
CPC ......... *C08L 23/16* (2013.01); *C08L 2205/025* (2013.01); *C08L 2205/03* (2013.01); *C08L 2205/06* (2013.01); *C08L 2205/24* (2013.01)

(58) Field of Classification Search
None
See application file for complete search history.

(56) References Cited

FOREIGN PATENT DOCUMENTS

| JP | 2008-205266 A | 9/2008 |
|----|---------------|--------|
| JP | 2011-071580 A | 4/2011 |
| JP | 5277785 B2 | 8/2013 |
| JP | 5636320 B2 | 12/2014 |

OTHER PUBLICATIONS

ASTM Standard D790, 2017, "Standard Test Methods for Flexural Properties of Unreinforced and Reinforced Plastics and Electrical Insulating Materials", ASTM International. (Year: 2017).*
ASTM Standard E831, 2019. "Standard Test Method for Linear Thermal Expansion of Solid Materials by Thermomechanical Analysis", ASTM International. (Year: 2019).*

\* cited by examiner

*Primary Examiner* — Richard A Huhn
(74) *Attorney, Agent, or Firm* — MCDONNELL BOEHNEN HULBERT & BERGHOFF LLP

(57) ABSTRACT

The present disclosure provides a thermoplastic resin composition having high rigidity and a low coefficient of linear thermal expansion and a molded article including the same. Specifically, the thermoplastic resin composition includes a base resin including at least two polypropylene-based resins having different melt indexes, an elastomer having a melt index (190° C., 2.16 kg) of 20 g/10 min to 35 g/10 min as measured by ASTM D1238, and inorganic particles, and has a flexural modulus (FM) of 2,500 MPa or more and a coefficient of linear thermal expansion (CLTE) of 60 μm/m° C. or less.

13 Claims, No Drawings

THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

CROSS REFERENCE TO RELATED APPLICATIONS

This application claims under 35 U.S.C. § 119(a) the benefit of priority from Korean Patent Application No. 10-2021-0088632, filed on Jul. 6, 2021, the entire contents of which are incorporated herein by reference.

BACKGROUND

(a) Technical Field

The present disclosure relates to a thermoplastic resin composition having high rigidity and a low coefficient of linear thermal expansion and a molded article including the same.

(b) Background Art

With the trend of increasingly stringent international environmental regulations and fuel economy regulations and the rising price of energy resources, new technologies for the development of materials and parts for automobiles are required for improving fuel efficiency and also increasing competitiveness according to environmental regulations.

A promising way to improve the fuel efficiency of automobiles is weight reduction technology. By reducing the weight thereof, engine efficiency may be improved, the performance of automobiles may be maximized, and increased fuel efficiency will be shown.

The weight reduction of automobiles is broadly divided into weight reduction of materials achieved using hollow materials, weight reduction of materials achieved through foaming, and weight reduction of materials achieved through part thinning.

In general, the weight reduction of materials through thinning is achieved in a manner such that the thinning is carried out while maintaining the physical properties of parts using high-rigidity inorganic fillers such as long fibers, carbon fibers and the like. However, this method results in poor moldability, so the appearance of parts is not uniform during molding, and a problem of poor dimensional stability in the longitudinal and transverse directions may occur.

With the goal of solving this problem, composite polypropylene to which a high-fluidity resin and a high-rigidity inorganic filler are applied may be devised. However, if the injection flowability of the composite polypropylene is too high or too low, flow marks may be formed, and thin parts cannot be manufactured unless an appropriate inorganic filler is used. In particular, polypropylene as a base resin becomes crystallized during melting, molding, and cooling steps of injection molding, and dimensional stability is highly likely to be problematic due to the high shrinkage rate and the high coefficient of linear thermal expansion of polypropylene.

SUMMARY

Accordingly, an objective of the present disclosure is to provide an automobile exterior material having reduced weight through thin-part molding.

Another objective of the present disclosure is to provide a thermoplastic resin composition capable of producing a molded article having improved mechanical properties such as rigidity and the like, while simultaneously exhibiting good dimensional stability.

The objectives of the present disclosure are not limited to the foregoing, and will be able to be clearly understood through the following description and to be realized by the means described in the claims and combinations thereof.

An embodiment of the present disclosure provides a thermoplastic resin composition including a base resin including a first polypropylene-based resin having a melt index (230° C., 2.16 kg) of 90 g/10 min to 110 g/10 min as measured by ASTM D1238 and a second polypropylene-based resin having a melt index (230° C., 2.16 kg) of 50 g/10 min to 70 g/10 min as measured by ASTM D1238, an elastomer having a melt index (190° C., 2.16 kg) of 20 g/10 min to 35 g/10 min as measured by ASTM D1238, and inorganic particles, in which the thermoplastic resin composition has a flexural modulus (FM) of 2,500 MPa or more and a coefficient of linear thermal expansion (CLTE) of 60 μm/m·° C. or less.

Each of the first polypropylene-based resin and the second polypropylene-based resin may include at least one selected from the group consisting of homo-polypropylene, a copolymer of propylene and α-olefin having 2 and 4 to 20 carbon atoms, and combinations thereof.

The base resin may include the first polypropylene-based resin and the second polypropylene-based resin at a weight ratio of 1:0.2 to 1:0.6.

The elastomer may include a copolymer of ethylene and α-olefin having 3 to 8 carbon atoms.

The inorganic particles may include at least one selected from the group consisting of talc, mica, calcium carbonate, wollastonite, clay, magnesium sulfate, whiskers, and combinations thereof.

The inorganic particles may have an average diameter of 1 μm to 3 μm.

The thermoplastic resin composition may include 50 wt % to 60 wt % of the base resin, 15 wt % to 30 wt % of the elastomer, and 20 wt % to 35 wt % of the inorganic particles.

The thermoplastic resin composition may further include at least one nucleating agent selected from the group consisting of a cyclohexane dicarboxylic acid metal salt, metal stearate, and combinations thereof.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

Another embodiment of the present disclosure provides a molded article including the thermoplastic resin composition described above.

The molded article may have IZOD impact strength of 320 J/m or more measured at 23° C. according to ASTM D256 and IZOD impact strength of 45 J/m or more measured at −30° C.

The molded article may have tensile strength of 17 MPa or more measured according to ASTM D638.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

According to the present disclosure, it is possible to maximize the performance of automobiles by reducing the weight of an automobile exterior material.

In addition, according to the present disclosure, it is possible to obtain a thermoplastic resin composition capable of producing a molded article having excellent mechanical properties such as rigidity and the like while simultaneously exhibiting good dimensional stability.

The effects of the present disclosure are not limited to the foregoing, and should be understood to include all effects that may be reasonably anticipated from the following description.

DETAILED DESCRIPTION

The above and other objectives, features and advantages of the present disclosure will be more clearly understood from the following preferred embodiments. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A thermoplastic resin composition according to the present disclosure includes a base resin including a polypropylene-based resin, an elastomer, inorganic particles, and a nucleating agent.

The base resin may include at least two kinds of polypropylene having different melt indexes in specific amounts.

Specifically, the base resin includes a first polypropylene-based resin having a melt index (230° C., 2.16 kg) of 90 g/10 min to 110 g/10 min as measured by ASTM D1238 and a second polypropylene-based resin having a melt index (230° C., 2.16 kg) of 50 g/10 min to 70 g/10 min as measured by ASTM D1238.

If the melt index of each of the first polypropylene-based resin and the second polypropylene-based resin is less than the above lower limit, the flowability of the thermoplastic resin composition during injection molding may be decreased and thus processability may be deteriorated, whereas if the melt index thereof exceeds the above upper limit, the mechanical properties of a molded article made of the thermoplastic resin composition may be deteriorated.

Also, the first polypropylene-based resin may have impact strength of 40 J/m to 60 J/m, or 50 J/m to 60 J/m. The second polypropylene-based resin may have impact strength of 60 J/m to 80 J/m, or 60 J/m to 70 J/m.

Each of the first polypropylene-based resin and the second polypropylene-based resin may include at least one selected from the group consisting of homo-polypropylene, a copolymer of propylene and α-olefin having 2 and 4 to 20 carbon atoms, and combinations thereof.

Examples of the α-olefin monomer having 2 and 4 to 20 carbon atoms may include ethylene, 1-butene, 1-pentene, 1-hexene, 4-methylpentene, 1-heptene, 1-octene, 1-decene, and the like.

Also, the copolymer of propylene and α-olefin monomer having 2 and 4 to 20 carbon atoms may be an alternating copolymer, a block copolymer, or a random copolymer.

The copolymer of propylene and α-olefin monomer having 2 and 4 to 20 carbon atoms may include about 50 wt % or more of a propylene repeating unit, and particularly about 50 wt % to about 90 wt % of a propylene repeating unit. Since the copolymer includes propylene in a relatively large amount, the crystallinity thereof is high, and thus the rigidity of a molded article made of the thermoplastic resin composition may be improved.

The base resin may include the first polypropylene-based resin and the second polypropylene-based resin at a weight ratio of 1:0.2 to 1:0.6.

The thermoplastic resin composition may include 50 wt % to 60 wt % of the base resin. If the amount of the polypropylene-based resin is less than the above lower limit, mechanical properties such as flexural modulus and the like of a molded article made of the thermoplastic resin composition may be deteriorated, whereas if the amount thereof exceeds the above upper limit, impact strength or the like may be deteriorated.

The elastomer is used to increase the impact strength, heat resistance, and moldability of the molded article.

The elastomer may include a copolymer of ethylene and α-olefin having 3 to 8 carbon atoms. The elastomer may be an alternating copolymer, a block copolymer, or a random copolymer.

The copolymer rubber of ethylene and α-olefin having 3 to 8 carbon atoms may include 20 to 50 wt % of α-olefin.

The α-olefin having 3 to 8 carbon atoms may include at least one selected from the group consisting of 1-propene, 1-butene, 1-pentene, 4-methyl-1-pentene, 1-hexene, 1-heptene, 1-octene, and combinations thereof.

The elastomer may have a melt index (190° C., 2.16 kg) of 20 g/10 min to 35 g/10 min as measured by ASTM D1238. If the melt index thereof is less than the above lower limit, the thermoplastic elastomer may not be well dispersed in the thermoplastic resin composition due to poor flowability, whereas if the melt index thereof exceeds the above upper limit, the impact strength of the molded article may be decreased.

The thermoplastic resin composition may include 15 wt % to 30 wt % of the elastomer. If the amount of the elastomer is less than the above lower limit, the impact strength of the molded article may be decreased, whereas if the amount thereof exceeds the above upper limit, ductility may be increased and thus mechanical properties such as flexural modulus, etc. may be deteriorated.

The inorganic particles are used to reduce the weight of the molded article and improve the mechanical rigidity, impact resistance, and dimensional stability of the molded article.

The inorganic particles may include at least one selected from the group consisting of talc, mica, calcium carbonate, wollastonite, clay, magnesium sulfate, whiskers, and combinations thereof.

The inorganic particles may have an average diameter of 1 μm to 3 μm. If the average diameter thereof is less than the above lower limit, the compatibility between the base resin and the inorganic particles may be deteriorated, and thus it may be difficult to finely disperse the inorganic particles, thereby causing a problem in which the inorganic particles agglomerate. On the other hand, if the average diameter thereof exceeds the above upper limit, the impact strength and flexural modulus of the molded article may be deteriorated.

The thermoplastic resin composition may include 20 wt % to 35 wt % of the inorganic particles. If the amount of the inorganic particles is less than the above lower limit, the flexural modulus of the molded article may be lowered, whereas if the amount thereof exceeds the above upper limit, the specific gravity of the thermoplastic resin composition may increase, making it difficult to reduce the weight of a molded article, and the impact strength may be deteriorated due to the excessive addition thereof.

The nucleating agent is used to increase the rigidity and dimensional stability of the molded article by promoting rapid crystallization of the base resin, elastomer, and the like.

The nucleating agent may include at least one selected from the group consisting of a cyclohexane dicarboxylic acid metal salt, metal stearate, and combinations thereof.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The amount of the additive is not particularly limited, and may be, for example, 0.1 wt % to 6 wt %.

The antioxidant may include at least one selected from the group consisting of a phenol-based antioxidant, a phosphite-based antioxidant, thiodipropionate, and combinations thereof.

The slipping agent is used to improve scratch resistance by imparting slipperiness to the surface of a molded article using the thermoplastic resin composition. The slipping agent may include at least one selected from the group consisting of a siloxane-based slipping agent, an amide-based slipping agent, and combinations thereof.

The antistatic agent is used to reduce the generation of static electricity due to friction and to ensure that the additive is uniformly dispersed. The antistatic agent may include at least one selected from the group consisting of a low-molecular-weight antistatic agent, a high-molecular-weight antistatic agent, a conductive polymer, and combinations thereof.

In addition, the present disclosure pertains to a molded article produced using the thermoplastic resin composition. The method of manufacturing the molded article is not particularly limited, and may include various methods, such as injection, extrusion, and the like.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

Also, the molded article is thin and is thus advantageous in view of reducing the weight of exterior materials, and simultaneously exhibits excellent mechanical rigidity, impact resistance, and dimensional stability. For example, the molded article may exhibit excellent mechanical strength and impact resistance even at a thickness of less than about 2.5 mm, or of 2.0 mm to 2.2 mm.

A better understanding of the present disclosure may be obtained through the following examples. These examples are merely set forth to illustrate the present disclosure, and are not to be construed as limiting the present disclosure.

EXAMPLES 1 AND 2 AND COMPARATIVE EXAMPLES 1 TO 5

Respective thermoplastic resin compositions were obtained by mixing components in the amounts shown in Table 1 below. Specifically, the individual components were kneaded using a Super mixer or a ribbon mixer. Pellets were manufactured through water cooling using a twin-screw extruder (manufacturer: SM, diameter: 45 mm) under conditions of a temperature of 180° C. to 220° C., an extruder screw speed of 240 rpm, and a hopper feed speed of 700 rpm. The pellets were molded into samples having a predetermined shape using an injection-molding machine (manufacturer: Nikita, clamping force: 180 tons) set at 220° C.

TABLE 1

| Classification | Unit | Example 1 | Example 2 | Comparative Example 1 | Comparative Example 2 | Comparative Example 3 | Comparative Example 4 | Comparative Example 5 |
|---|---|---|---|---|---|---|---|---|
| First polypropylene-based resin | wt % | 45 | 35 | 40 | 40 | 55 | 55 | 70 |
| Second polypropylene-based resin | wt % | 10 | 20 | — | — | — | — | — |
| Elastomer | wt % | 20 | 20 | 35 | 20 | 20 | 20 | 5 |
| Inorganic particles A | wt % | 25 | 25 | 25 | 40 | — | — | 25 |

TABLE 1-continued

| Classification | Unit | Example 1 | Example 2 | Comparative Example 1 | Comparative Example 2 | Comparative Example 3 | Comparative Example 4 | Comparative Example 5 |
|---|---|---|---|---|---|---|---|---|
| Inorganic particles B | wt % | — | — | — | — | 25 | — | — |
| Inorganic particles C | wt % | — | — | — | — | — | 25 | — |

The first polypropylene-based resin was a propylene-ethylene copolymer having a melt index (230° C., 2.16 kg) of 90 g/10 min to 110 g/10 min as measured by ASTM D1238.

The second polypropylene-based resin was a propylene-ethylene copolymer having a melt index (230° C., 2.16 kg) of 50 g/10 min to 70 g/10 min as measured by ASTM D1238.

The elastomer was an ethylene-octene copolymer having a melt index (190° C., 2.16 kg) of 20 g/10 min to 35 g/10 min as measured by ASTM D1238.

The inorganic particles A were talc having an average diameter of 1 μm to 3 μm.

The inorganic particles B were talc having an average diameter of 4 μm to 5 μm.

The inorganic particles C were talc having an average diameter of 6 μm to 11 μm.

TEST EXAMPLE

The physical properties of the molded articles according to Examples 1 and 2 and Comparative Examples 1 to 5 were measured using the following methods and conditions.

(1) Melt index: Measurement was made according to ASTM D1238. Here, the cylinder temperature was 190° C. and the load was 2.16 kgf.

(2) Specific gravity (g/μl): Measurement was made according to ASTM D 792.

(3) Tensile strength: Measurement was made at 50 mm/min according to ASTM D638.

(4) Flexural modulus: Measurement was made according to ASTM D790. Here, the sample size was 127×12.7×6.4 mm, the span length was 100 mm, and the test speed was 10 mm/min.

(5) IZOD impact strength: Measurement was made according to ASTM D256. Here, the sample size was 63.5×12.7×6.4 mm and a notched sample was used.

(6) Heat deflection temperature: Measurement was made according to ASTM D648. Here, the sample size was 127×12.7×6.4 mm and the stress load was 0.45 MPa.

(7) Coefficient of linear thermal expansion: Measurement was made according to ASTM E831. Here, the sample size was 10×12.7×3.2 mm, and during the test, the temperature was raised at a rate of 5° C./min to measure the coefficient of linear thermal expansion in the range of −30° C. to 30° C.

TABLE 2

| Classification | Unit | Example 1 | Example 2 | Comparative Example 1 | Comparative Example 2 | Comparative Example 3 | Comparative Example 4 | Comparative Example 5 |
|---|---|---|---|---|---|---|---|---|
| Melt index | g/10 min | 48 | 40 | 25 | 30 | 45 | 50 | 55 |
| Specific gravity | g/μl | 1.07 | 1.07 | 1.07 | 1.22 | 1.07 | 1.07 | 1.07 |
| Tensile strength | MPa | 20 | 21 | 16 | 23 | 20 | 20 | 23 |
| Flexural modulus | MPa | 2,510 | 2,650 | 1,800 | 2,800 | 2,380 | 2,250 | 2,750 |
| IZOD (@23° C.) | J/m | 410 | 400 | 600 | 150 | 340 | 300 | 80 |
| IZOD (@−30° C.) | J/m | 55 | 47 | 80 | 30 | 40 | 38 | 24 |
| Coefficient of linear thermal expansion | μm/m · ° C. | 58 | 60 | 56 | 55 | 61 | 63 | 70 |

As is apparent from Table 2, in Comparative Example 1, in which the amount of the base resin was low and the amount of the elastomer was high, the tensile strength and the flexural modulus were deteriorated.

In Comparative Example 2, in which the amount of the base resin was low and the amount of the inorganic particles was high, the specific gravity was high and the impact strength was poor.

In Comparative Examples 3 and 4, using inorganic particles having a large average diameter, the flexural modulus and the coefficient of linear thermal expansion were deteriorated.

In Comparative Example 5, in which the amount of the base resin was high and the amount of the elastomer was low, the impact strength and the coefficient of linear thermal expansion were deteriorated.

Examples 1 and 2, including individual components satisfying the physical properties according to the present disclosure in appropriate amounts, exhibited superior results, such as IZOD impact strength of 320 J/m or more measured at 23° C., IZOD impact strength of 45 J/m or more measured at −30° C., tensile strength of 17 MPa or more, a flexural modulus of 2,500 MPa or more, and a coefficient of linear thermal expansion of 60 μmm/m·° C. or less.

Although specific embodiments of the present disclosure have been described, those skilled in the art will appreciate that the present disclosure may be embodied in other specific forms without changing the technical spirit or essential features thereof. Thus, the embodiments described above should be understood to be non-limiting and illustrative in every way.

The invention claimed is:

1. A thermoplastic resin composition comprising:
a base resin comprising a first polypropylene-based resin having a melt index (230° C., 2.16 kg) of 90 g/10 min to 110 g/10 min as measured by ASTM D1238, and a second polypropylene-based resin having a melt index (230° C., 2.16 kg) of 50 g/10 min to 70 g/10 min as measured by ASTM D1238;
an elastomer having a melt index (190° C., 2.16 kg) of 20 g/10 min to 35 g/10 min as measured by ASTM D1238; and
inorganic particles.

2. The thermoplastic resin composition of claim 1, wherein each of the first polypropylene-based resin and the second polypropylene-based resin comprises at least one selected from the group consisting of: homo-polypropylene, a copolymer of propylene and α-olefin having 2 and 4 to 20 carbon atoms, and combinations thereof.

3. The thermoplastic resin composition of claim 1, wherein the base resin comprises the first polypropylene-based resin and the second polypropylene-based resin at a weight ratio of 1:0.2 to 1:0.6.

4. The thermoplastic resin composition of claim 1, wherein the elastomer comprises a copolymer of ethylene and α-olefin having 3 to 8 carbon atoms.

5. The thermoplastic resin composition of claim 1, wherein the inorganic particles comprise at least one selected from the group consisting of: talc, mica, calcium carbonate, wollastonite, clay, magnesium sulfate, whiskers, and combinations thereof.

6. The thermoplastic resin composition of claim 1, wherein the inorganic particles have an average diameter of 1 μm to 3 μm.

7. The thermoplastic resin composition of claim 1, comprising:
50 wt % to 60 wt % of the base resin;
15 wt % to 30 wt % of the elastomer; and
20 wt % to 35 wt % of the inorganic particles.

8. The thermoplastic resin composition of claim 1, further comprising at least one nucleating agent selected from the group consisting of: a cyclohexane dicarboxylic acid metal salt, metal stearate, and combinations thereof.

9. The thermoplastic resin composition of claim 1, further comprising at least one additive selected from the group consisting of: an antioxidant, an ultraviolet absorber, a nucleating agent, a coupling agent, a dispersant, a light stabilizer, a processing lubricant, a slipping agent, an antistatic agent, an inorganic pigment, and combinations thereof.

10. A molded article comprising the thermoplastic resin composition of claim 1.

11. The molded article of claim 10, wherein IZOD impact strength measured at 23° C. according to ASTM D256 is 320 J/m or more and IZOD impact strength measured at −30° C. is 45 J/m or more.

12. The molded article of claim 10, wherein tensile strength measured according to ASTM D638 is 17 MPa or more.

13. The molded article of claim 10, wherein the molded article is at least one automobile exterior material selected from the group consisting of: a side sill molding, door molding, fender molding, quarter glass molding, roof rack, side outer garnish, roof molding garnish, back panel molding, tailgate garnish, and combinations thereof.

* * * * *